(12) United States Patent
Tokuyama et al.

(10) Patent No.: US 10,086,546 B2
(45) Date of Patent: Oct. 2, 2018

(54) APPARATUS FOR TAKING OUT MOLDED PRODUCT

(71) Applicant: Yushin Precision Equipment Co., Ltd., Kyoto (JP)

(72) Inventors: Yoshiyuki Tokuyama, Kyoto (JP); Satoshi Jo, Kyoto (JP); Ryo Ohta, Kyoto (JP); Mitsuharu Hamahata, Kyoto (JP); Takayuki Mori, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 403 days.

(21) Appl. No.: 14/865,225

(22) Filed: Sep. 25, 2015

(65) Prior Publication Data

US 2016/0114508 A1 Apr. 28, 2016

(30) Foreign Application Priority Data

Oct. 22, 2014 (JP) .................................. 2014-215272

(51) Int. Cl.
*B29C 45/42* (2006.01)

(52) U.S. Cl.
CPC ...... *B29C 45/42* (2013.01); *B29C 2045/4266* (2013.01); *B29C 2045/4283* (2013.01)

(58) Field of Classification Search
CPC .... B29C 2045/4283; B29C 2045/4266; B29C 45/42; B29C 2045/425; B29C 2045/4291; B29C 2045/4241; B29C 45/4225
See application file for complete search history.

(56) References Cited

U.S. PATENT DOCUMENTS

| | | | | |
|---|---|---|---|---|
| 3,669,592 A | * | 6/1972 | Miller | B29C 45/1759 425/155 |
| 3,764,022 A | * | 10/1973 | Ishida | B29C 45/42 414/618 |
| 4,005,782 A | * | 2/1977 | Crockett | B21D 43/105 414/591 |

(Continued)

FOREIGN PATENT DOCUMENTS

| | | |
|---|---|---|
| EP | 0 192 134 A2 | 2/1986 |
| JP | 2005-007666 | 1/2005 |
| JP | 2009-269100 | 11/2009 |

OTHER PUBLICATIONS

Irish Search Report dated Aug. 15, 2016.

*Primary Examiner* — Yogendra N Gupta
*Assistant Examiner* — Emmanuel S Luk
(74) *Attorney, Agent, or Firm* — Rankin, Hill & Clark LLP

(57) ABSTRACT

An apparatus for taking out a molded product, includes: a transverse frame disposed above a resin injection molding machine to extend in a transverse direction, which is orthogonal to a longitudinal direction; an orthogonal frame supported by the transverse frame so as to be movable at least in the transverse direction; a vertical arm provided at the orthogonal frame so as to be movable up and down at least in the vertical direction; and a holding member provided at a distal end portion of the vertical arm to hold a resin molded product formed by the resin injection molding machine. The vertical arm is disposed so as to be inclined such that the axis line of an elevating shaft of the vertical arm forms an acute angle with respect to a perpendicular extending in the vertical direction.

18 Claims, 10 Drawing Sheets

(56) References Cited

U.S. PATENT DOCUMENTS

| | | | | | |
|---|---|---|---|---|---|
| 4,408,973 | A | * | 10/1983 | Tanaka | B29C 45/42 425/139 |
| 4,679,291 | A | * | 7/1987 | Schmeal | B27F 7/006 156/249 |
| 4,732,554 | A | * | 3/1988 | Hellmann | B25J 9/0012 156/538 |
| 4,781,571 | A | | 11/1988 | Heindl et al. | |
| 4,795,124 | A | * | 1/1989 | Nagai | B29C 37/0007 164/344 |
| 5,000,654 | A | * | 3/1991 | Shiotani | B29C 37/0007 198/750.11 |
| 5,334,009 | A | * | 8/1994 | Urbanek | B29C 45/42 425/436 R |
| 5,372,319 | A | * | 12/1994 | Dolgas | H02K 15/00 242/433.4 |
| 5,372,492 | A | * | 12/1994 | Yamauchi | F25C 5/14 249/79 |
| 5,513,970 | A | * | 5/1996 | Kimura | B29C 45/42 264/334 |
| 5,629,031 | A | * | 5/1997 | Ishikawa | B29C 45/42 264/334 |
| 6,220,494 | B1 | * | 4/2001 | Raffoni | B27F 7/006 227/111 |
| 6,296,472 | B1 | * | 10/2001 | Ito | B29C 45/17 425/542 |
| 6,386,859 | B1 | * | 5/2002 | Hehl | B29C 45/42 425/438 |
| 6,390,804 | B1 | * | 5/2002 | Akino | B29C 45/42 264/334 |
| 6,485,285 | B1 | * | 11/2002 | Shiotani | B29C 45/42 414/225.01 |
| 2001/0028903 | A1 | * | 10/2001 | Koide | B29C 45/42 425/556 |
| 2003/0070502 | A1 | * | 4/2003 | Brett | B25J 9/046 74/490.01 |
| 2004/0247737 | A1 | * | 12/2004 | Ha | B29C 45/42 425/556 |
| 2005/0276878 | A1 | * | 12/2005 | Nihei | B25J 9/042 425/444 |
| 2012/0039697 | A1 | * | 2/2012 | Jin | B25J 15/0616 414/737 |
| 2012/0294961 | A1 | * | 11/2012 | Ishibashi | B29C 45/42 425/139 |

* cited by examiner

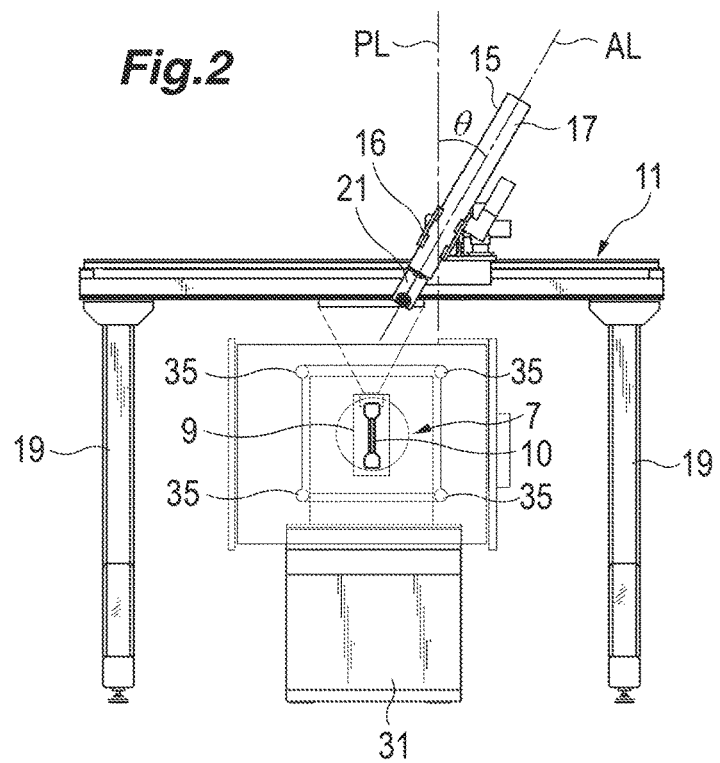
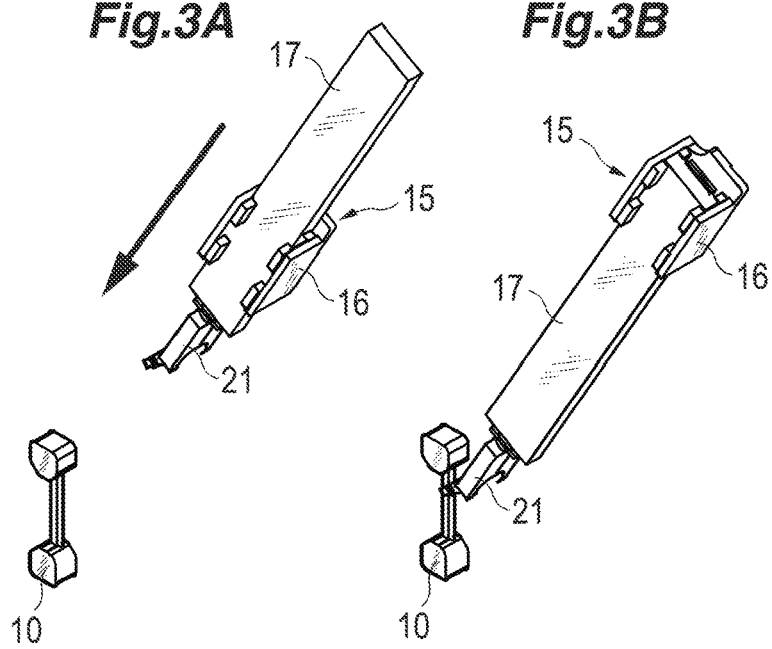

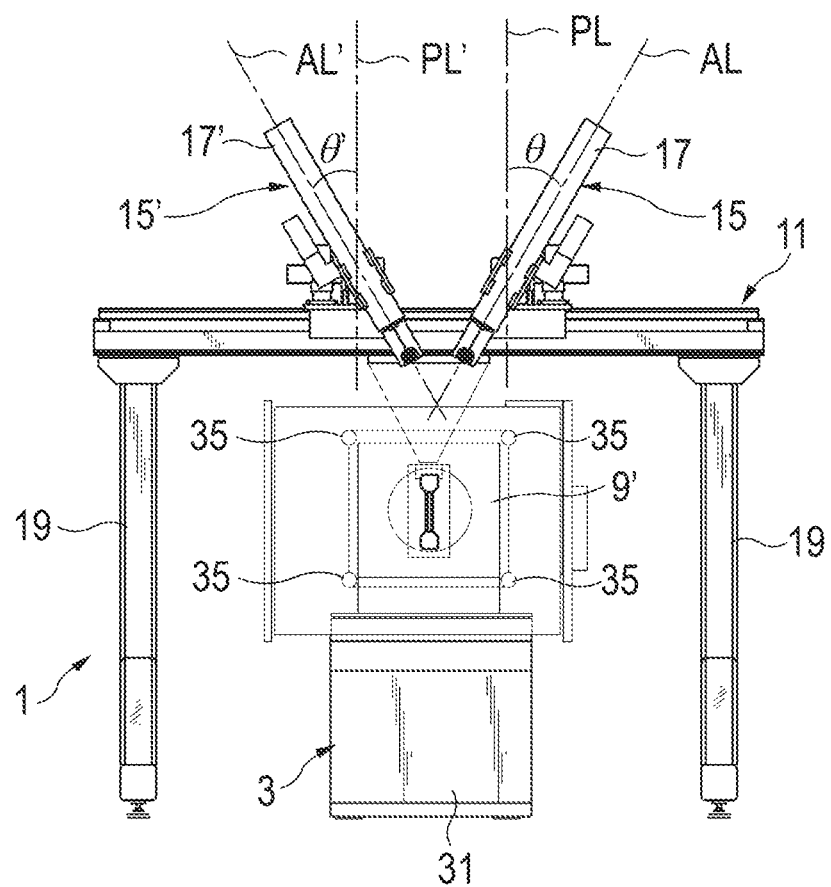

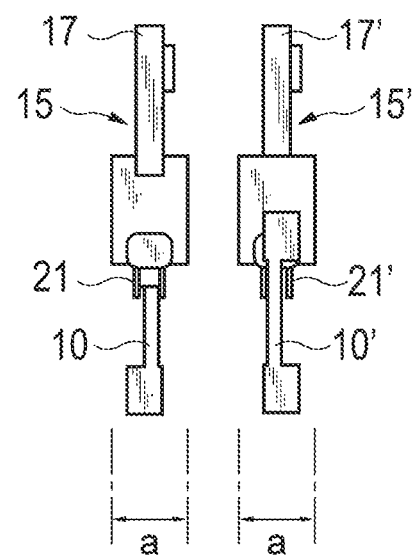

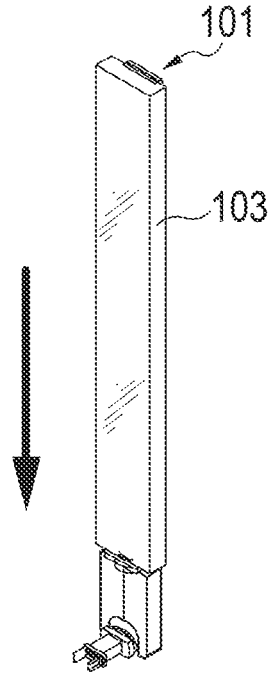
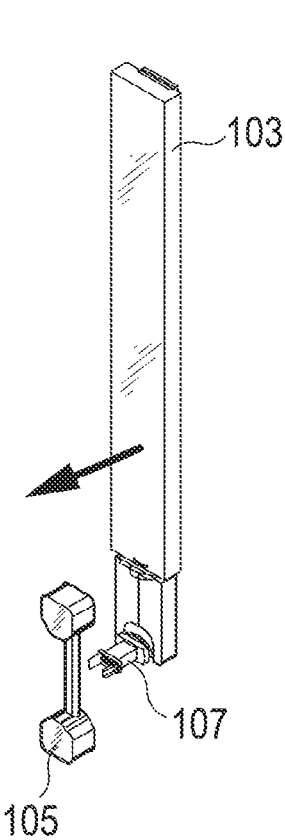
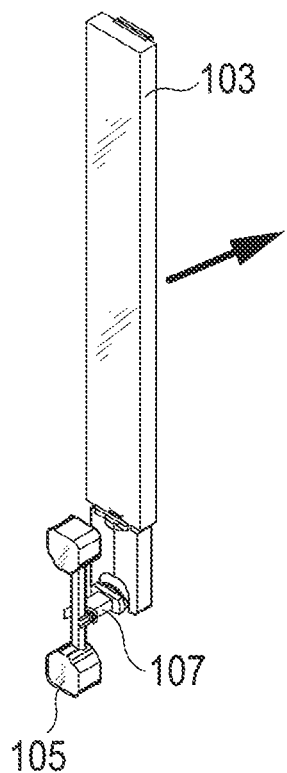
*Fig.12A (Prior Art)*
*Fig.12B (Prior Art)*
*Fig.12C (Prior Art)*

APPARATUS FOR TAKING OUT MOLDED PRODUCT

TECHNICAL FIELD

The present invention relates to an apparatus for taking out a molded product, the apparatus being provided on a resin injection molding machine to take out a resin molded product molded by the resin injection molding machine from the upper side of a molding die.

BACKGROUND ART

A conventional apparatus for taking out a molded product as in JP 2009-269100 A, etc. includes: a transverse frame disposed above a resin injection molding machine to extend in a transverse direction; an orthogonal frame supported by the transverse frame so as to be movable at least in the transverse direction; a vertical arm provided at the orthogonal frame so as to be movable up and down in a vertical direction; and a holding member provided at the distal end portion of the vertical arm to hold a resin molded product formed by the resin injection molding machine. In the conventional apparatus, the axis of an elevating shaft of the vertical arm coincides with a perpendicular that extends in the vertical direction. In the conventional apparatus, when the resin molded product is taken out of the molding die, a vertical arm 101 is moved to a location above the molding die which is opened. After that, an elevating shaft 103 of the vertical arm 101 is lowered (lowering step) as illustrated in FIG. 12A. Then, the vertical arm 101 is moved toward a resin molded product 105 to cause a holding member 107 such as a retaining head provided at the distal end portion of the vertical arm 101 to approach the resin molded product 105 (advancing step) as illustrated in FIG. 12B. After the resin molded product 105 is held by the holding member 107, the vertical arm 101 is moved away from the die (retracting step) as illustrated in FIG. 12C. Then, the elevating shaft 103 of the vertical arm 101 is elevated (elevating step) to take out the resin molded product 105. Thus, four steps are required to drive the vertical arm 101 to take out the resin molded product.

If a resin injection molding machine 201 uses a three-plate molding die 203, as illustrated in FIGS. 11A and 11B, an orthogonal frame 209 is movably provided at a transverse frame 207 of an apparatus 205 for taking out a molded product, and two vertical arms 211 and 213 are provided at the orthogonal frame 209. The three-plate molding die 203 includes a fixed mold 215, a movable mold 217 disposed so as to be movable with respect to the fixed mold 215, and an intermediate movable mold 219 located between the fixed mold 215 and the movable mold 217 and disposed so as to be movable with respect to the fixed mold 215 and the movable mold 217. A resin molded product is formed between the fixed mold 215 and the intermediate movable mold 219, and another resin molded product is formed between the intermediate movable mold 219 and the movable mold 217. When such a three-plate molding die is used, the resin molded product formed between the fixed mold 215 and the intermediate movable mold 219 is held and taken out by a holding member 223 provided at an elevating shaft 221 of one of the two vertical arms 211 and 213, namely the vertical arm 211, and the resin molded product formed between the intermediate movable mold 219 and the movable mold 217 is held and taken out by a holding member 227 provided at an elevating shaft 225 of the other vertical arm 213.

Also when the three-plate die is used, the operation of driving the vertical arms 211 and 213 requires four steps as with the vertical arm illustrated in FIGS. 12A-12C.

SUMMARY OF INVENTION

Technical Problem

If the operation of driving the vertical arm requires the four steps discussed above as in the conventional apparatus, there may be a demand for increased speed for taking out a large number of resin molded products, but there is a limit to increasing the take-out speed. Further, in the conventional apparatus the holding member provided at the distal end of the vertical arm inevitably faces the front surface of the resin molded product. It is likely that a trace of being retained by a chuck or a trace of a suction mat is left on the front portion of the resin molded product. To avoid such trace as much as possible, the structure of the chuck must be changed, or the resin molded product must be taken out by means other than suctioning.

An object of the present invention is to provide an apparatus for taking out a molded product that is capable of taking out a resin molded product in a reduced number of steps compared to the conventional apparatuses.

Another object of the present invention is to provide an apparatus for taking out a molded product that is capable of taking out a resin molded product that cannot be taken out by the conventional apparatuses.

Solution to Problem

The present invention is aimed at improving an apparatus for taking out a molded product, including: a transverse frame disposed above a resin injection molding machine to extend in a transverse direction that is orthogonal to a longitudinal direction defined as a direction in which a molding die of the resin injection molding machine is opened and closed; one or more orthogonal frames supported by the transverse frame so as to be movable at least in the transverse direction; one or more vertical arms provided respectively at the one or more orthogonal frames so as to be movable up and down at least in a vertical direction; and one or more holding members provided respectively at distal end portions of the one or more vertical arms to hold a resin molded product formed by the resin injection molding machine. In the present invention, each of the one or more vertical arms is disposed so as to be inclined such that an axis line of the elevating shaft of each vertical arm forms an acute angle with respect to a perpendicular extending in the vertical direction. According to the present invention, unlike the related art, an elevating shaft of the vertical arm can be lowered from obliquely above the resin molded product. Therefore, the product can be taken out without such interference with the holding member that may be caused when the elevating shaft of the vertical arm is lowered from directly above the resin molded product. According to the present invention, in principle, the resin molded product can be taken out in three steps, namely the operation of moving the elevating shaft of the vertical arm up and down (a lowering step and an elevating step) and a retracting step, thereby reducing the number of steps. As a result, the take-out speed can be increased compared to the related art. In addition, depending on the shape of the resin molded product, the resin molded product can be taken out simply by moving the elevating shaft of the vertical arm up and down (the lowering step and the elevating step only).

Further, if it is required that the resin molded product should be held only at its side regions, the apparatus of the present invention can cause the holding members provided at the distal end portions of the vertical arms to approach the resin molded product in the transverse direction (from the left and right sides) and hold the molded product at its side regions. Thus, the resin molded product can be taken out in a manner that cannot be achieved by the conventional apparatus for taking out a molded product.

When the resin injection molding machine uses a three-plate molding die, the one or more orthogonal frames may include two orthogonal frames, the one or more vertical arms may include two vertical arms, and the transverse frame may be provided with the two orthogonal frames configured to be separately movable. In this configuration, the two vertical arms are disposed respectively at the two orthogonal frames. Also when the three-plate molding die is used, the number of steps in the take-out operation can be reduced by moving elevating shafts of the vertical arms from obliquely above to take out the resin molded products.

The one or more orthogonal frames may be movable in the longitudinal direction with respect to the transverse frame. Further, the one or more vertical arms are respectively provided at the one or more orthogonal frames so as further to be movable in the longitudinal direction. With such configurations, the movable range of the one or more vertical arms can be expanded to enhance the versatility.

The apparatus may further include a longitudinal frame extending in the longitudinal direction. In this configuration, the transverse frame may be supported by the longitudinal frame so as to be movable in the longitudinal direction. With this configuration, the movable range of the one or more vertical arms can be expanded. In addition, the molding die can be replaced using the one or more vertical arms.

One or more vertical arms may be respectively provided at the one or more orthogonal frames such that the acute angle is changeable. If the inclination angle for the one or more vertical arms is changeable, an appropriate inclination angle can be set in accordance with the shape of the resin molded product, which further enhances the versatility.

Going back to the configuration in which two vertical arms are respectively provided at two orthogonal frames, the two vertical arms are preferably inclined such that the axis lines of the respective elevating shafts of the two vertical arms cross each other on a side on which the resin injection molding machine is located. With this configuration, the vertical arms can be caused to approach the resin molded products from both sides of the molding die in a smaller number of steps.

The resin injection molding machine may include a fixed mold, a movable mold disposed so as to be movable with respect to the fixed mold, and an intermediate movable mold located between the fixed mold and the movable mold and disposed so as to be movable with respect to the fixed mold and the movable mold. The resin injection molding machine may be configured to form a resin molded product between the fixed mold and the intermediate movable mold and to form another resin molded product between the intermediate movable mold and the movable mold. If such a three-plate molding die is used, the resin molded product formed between the fixed mold and the intermediate movable mold is held and taken out by one of the two holding members provided on one of the two vertical arms, and the resin molded product formed between the intermediate movable mold and the movable mold is held and taken out by the other of the two holding members provided on the other of the two vertical arms. Depending on the shapes of the resin molded products, take-out of the resin molded products can be completed simply by moving the vertical arms up and down. In this case, the moving distance of the intermediate movable mold and the movable mold in the longitudinal direction can be reduced.

BRIEF DESCRIPTION OF DRAWINGS

These and other objects and many of the attendant advantages of the present invention will be readily appreciated as the same becomes better understood by reference to the following detailed description when considered in connection with the accompanying drawings.

FIG. 2 is a front view of the equipment in which a fixed mold of a two-plate molding die of the resin injection molding machine can be seen.

FIGS. 3A and 3B illustrate operation of the vertical arm.

FIG. 8 is a front view of the equipment in which a fixed mold of the three-plate molding die of the resin injection molding machine can be seen.

FIG. 10 illustrates the positional relationship between the two vertical arms and the mold.

FIGS. 12A to 12C illustrate operation of a vertical arm of the conventional apparatus for taking out a molded product.

DESCRIPTION OF EMBODIMENTS

An apparatus for taking out a molded product according to embodiments of the present invention will be described below with reference to the drawings.

First Embodiment

Figure 1A:
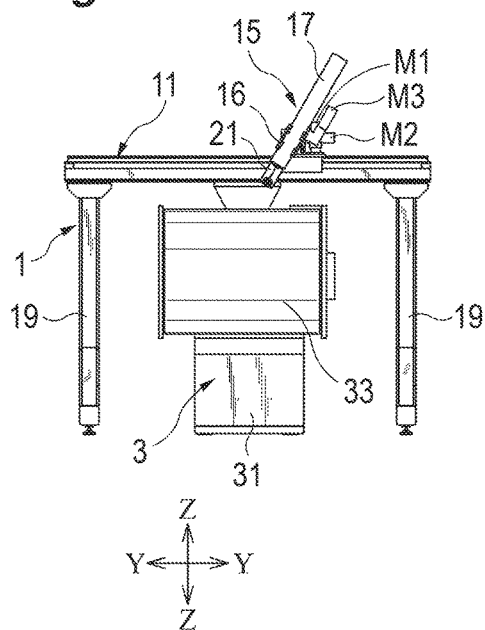
FIGS. 1A and 1B are a front view and a perspective view, respectively, of equipment for producing a molded product in which an apparatus for taking out a molded product according to a first embodiment of the present invention is disposed with respect to a resin injection molding machine 3, illustrating that a vertical arm is located at the uppermost position.
Figure 1B:
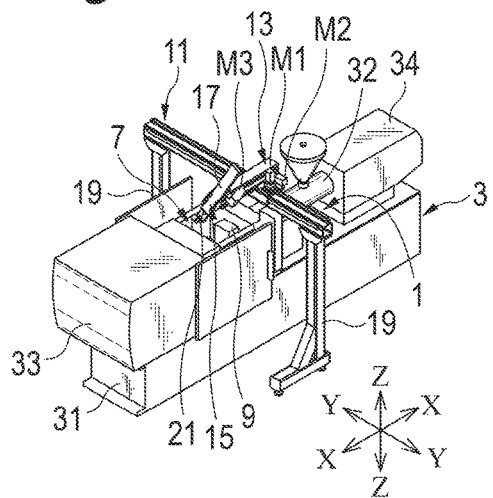
Figure 1C:
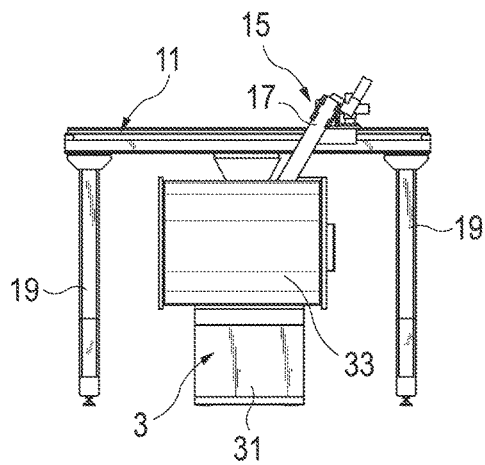
FIGS. 1C and 1D are a front view and a perspective view, respectively, of the equipment in which the apparatus is disposed with respect to the resin injection molding machine 3, illustrating that the vertical arm is located at the lowermost position.
Figure 1D:
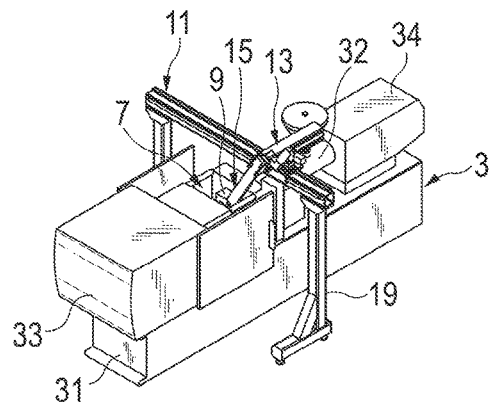
Figure 4A:
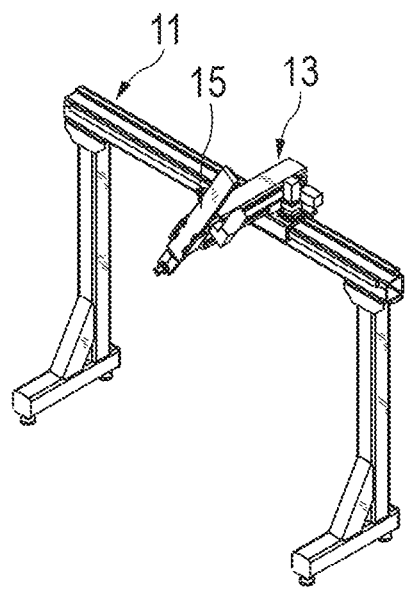
FIG. 4A is a perspective view illustrating that the vertical arm of the apparatus according to the first embodiment is located at the uppermost position.
Figure 4B:
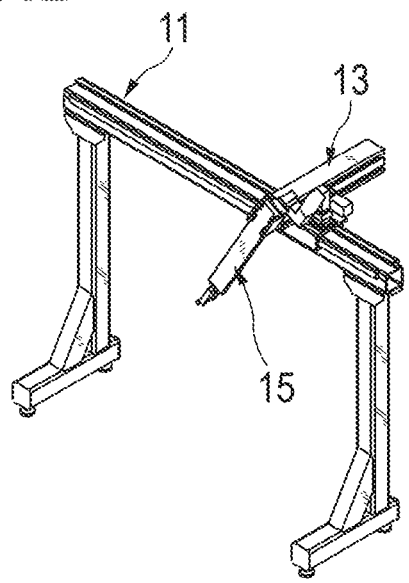
FIG. 4B is a perspective view illustrating that the vertical arm of the apparatus according to the first embodiment is located at the lowermost position.

FIGS. 1A and 1B are a front view and a perspective view, respectively, of equipment for producing a molded product in which an apparatus 1 for taking out a molded product according to a first embodiment of the present invention is disposed with respect to a resin injection molding machine 3, illustrating that a vertical arm 15 is located at the uppermost position. FIGS. 1C and 1D are a front view and a perspective view, respectively, of the equipment in which the apparatus 1 is disposed with respect to the resin injection molding machine 3, illustrating that the vertical arm 15 is located at the lowermost position. FIG. 2 is a front view of the equipment in which a fixed mold 9 of a two-plate molding die 7 of the resin injection molding machine 3 can be seen. FIGS. 3A and 3B illustrate operation of the vertical arm 15. FIG. 4A is a perspective view illustrating that the vertical arm 15 of the apparatus 1 according to the first embodiment is located at the uppermost position. FIG. 4B is a perspective view illustrating that the vertical arm 15 of the apparatus 1 according to the first embodiment is located at the lowermost position.

The resin injection molding machine 3 includes an injection device 32 and a die tightening device 33 installed on a machine base 31. The injection device 32 includes an injection motor 34 and various motors such as a metering motor and a nozzle touch motor, though not illustrated. The die tightening device 33 includes a die tightening motor, an ejection motor, and so forth. Driving the motors is controlled by a motor drive device.

As illustrated in FIG. 1B, the apparatus 1 includes: a transverse frame 11 disposed above the resin injection molding machine 3 to extend in a transverse direction (Y direction) that is orthogonal to a longitudinal direction (X direction) defined as a direction in which a molding die of the resin injection molding machine 3 is opened and closed; an orthogonal frame 13 that is supported by the transverse frame 11 so as to be movable in the transverse direction (Y direction) and that is movable in the longitudinal direction (X direction); a vertical arm 15 provided at the front end portion of the orthogonal frame 13 so as to be movable up and down in a vertical direction; and a holding member 21 such as a chuck provided at a distal end portion of the vertical arm 15 to hold a resin molded product 10 formed by the resin injection molding machine 3. In the embodiment, both ends of the transverse frame 11 are supported by a pair of leg portions 19 with respect to an installation surface.

A first drive motor M1 drives a truck, not illustrated, to move the orthogonal frame 13 mounted onto the truck in the transverse direction (Y direction) on the transverse frame 11. A second drive motor M2 moves the orthogonal frame 13 on the truck in the longitudinal direction (X direction) which is orthogonal to the transverse direction (Y direction). A third drive motor M3 drives an elevating shaft 17 of the vertical arm 15. A drive mechanism for the elevating shaft 17 driven by the third drive motor M3 may be any mechanism such as a rack-and-pinion mechanism. The elevating shaft 17 is guided by a guide mechanism 16 so as to be movable in an oblique direction. A part of the drive mechanism is housed in the guide mechanism 16.

As illustrated in FIG. 2, the vertical arm 15 is disposed so as to be inclined such that an axis line AL of the elevating shaft 17 of the vertical arm 15 forms an acute angle (θ) with respect to a perpendicular PL extending in the vertical direction. In the embodiment, specifically, the acute angle θ is set to about 30°. In consideration of interference with a guide shaft 35 of the molding die 7, the acute angle θ is preferably 40° or less.

In the embodiment, as illustrated in FIGS. 3A and 3B, the elevating shaft 17 of the vertical arm 15 can be lowered from obliquely above the resin molded product 10. In the operation of moving the elevating shaft 17 of the vertical arm 15 up and down, in principle, the holding member 21 (chuck) provided at the distal end of the vertical arm 15 is caused to approach the resin molded product 10, which has been ejected from the molding die by operation of an ejector pin, so that the holding member 21 directly holds the resin molded product 10 in the lowering step illustrated in FIG. 3A. If a portion ejected from the die is shaped so as to be directly held by a chuck or a suction nozzle such as the resin molded product 10 illustrated in FIG. 3B, the resin molded product 10 can be held only with the lowering step in which the elevating shaft 17 of the vertical arm 15 is lowered from obliquely above. Especially, if it is not desirable that a flaw or a suction trace should be left on a surface of the resin molded product located in the longitudinal direction (X direction), it is necessary to hold a lateral side portion of the resin molded product with the holding member 21. In such a case, the shape of the resin molded product is elaborated so as to increase the area of the lateral side portion of the resin molded product ejected by the ejector pin. Also in this case, the lateral side portion of the resin molded product can be directly held by the holding member 21 of the vertical arm 15 lowered from obliquely above. After the orthogonal frame 13 is retracted from the location shown in FIG. 3B to completely extract the resin molded product 10 from the die, the elevating shaft 17 of the vertical arm 15 is elevated upward (elevating step). The orthogonal frame 13 is movable in the longitudinal direction as illustrated in FIGS. 4A and 4B.

According to the embodiment, in the operation of taking out the resin molded product, the number of steps in the operation of the vertical arm 15 can be reduced by one step (a step of causing the vertical arm 15 to approach the resin molded product after the vertical arm is lowered) compared to the related art.

Figure 5:
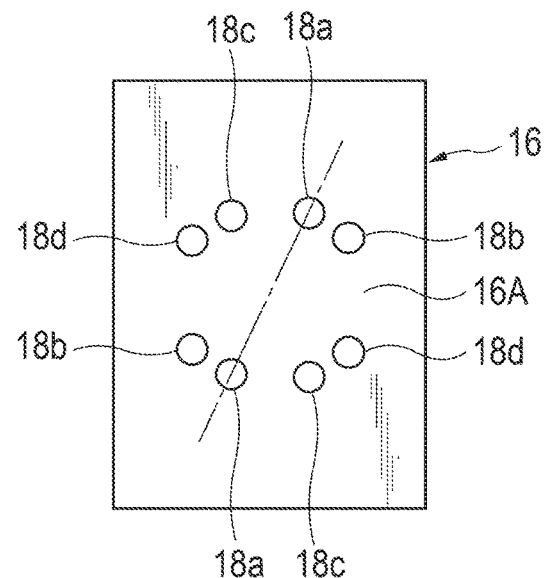
FIG. 5 illustrates an example structure that enables acute angle change.

As illustrated in FIG. 5, four pairs of mount holes 18a to 18d are formed in a mount wall portion 16A of the guide mechanism 16 for mounting onto the orthogonal frame 13. The guide mechanism is attached to the orthogonal frame 13 by inserting mount bolts provided at distal end portions of the orthogonal frame 13 into selected mount holes (e.g. a pair of mount holes 18a and 18a), and screwing nuts at the distal ends of the inserted mount bolts. To change the acute angle θ, it is sufficient only to change the selected pair of mount holes. The mechanism for changing the inclination angle of the vertical arm 15 is arbitrary, and a servo motor may be used to electrically change the angle.

Figure 6:
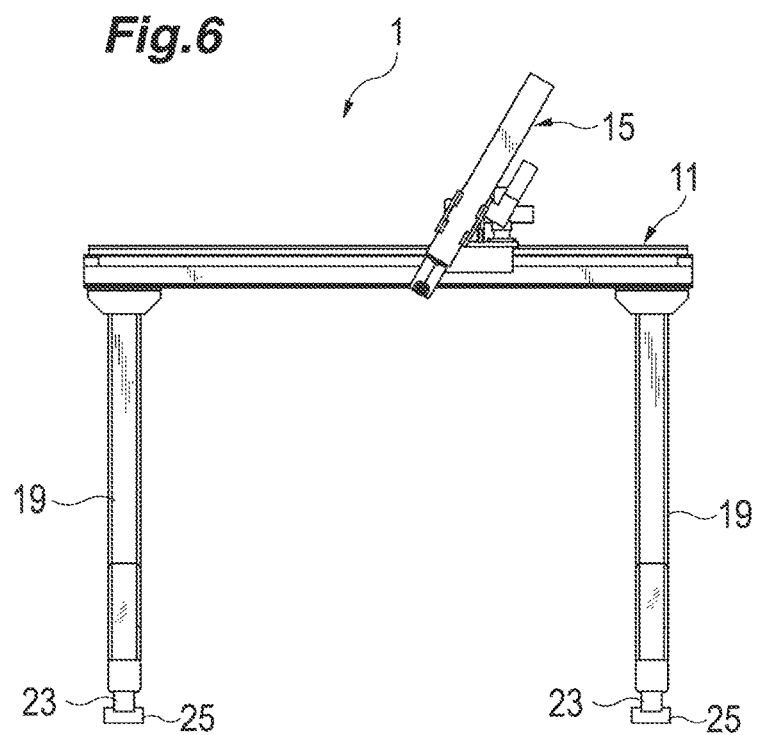
FIG. 6 illustrates an example configuration in which a longitudinal frame is additionally provided in the first embodiment.

If two or more wheels 23 are provided under the pair of leg portions 19 and 19 and a pair of rails 25 and 25 extending in the longitudinal direction are installed on the installation floor as illustrated in FIG. 6, the transverse frame 11 can be moved in the longitudinal direction. The pair of rails 25 and 25 constitute a longitudinal frame.

With this configuration, when replacing the molding die, the die can be transferred by hanging the die using the vertical arm and moving the transverse frame 11 forward or rearward. Thus, it is not necessary to separately prepare a crane for replacing the die.

In the embodiment described above, the orthogonal frame 13 is movable in the longitudinal direction with respect to the transverse frame 11. As a matter of course, however, the vertical arm 15 may be movable in the longitudinal direction with respect to the orthogonal frame 13 with the orthogonal frame 13 being arranged not to be movable in the longitudinal direction with respect to the transverse frame 11.

Second Embodiment

Figure 7A:
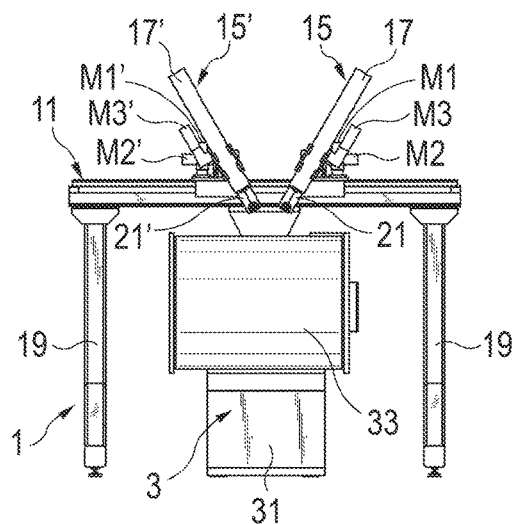
FIGS. 7A and 7B are a front view and a perspective view, respectively, of equipment for producing a molded product in which an apparatus for taking out a molded product according to a second embodiment of the present invention is disposed with respect to a resin injection molding machine 3 which uses a three-plate molding die, illustrating that two vertical arms are located at the uppermost position.
Figure 7B:
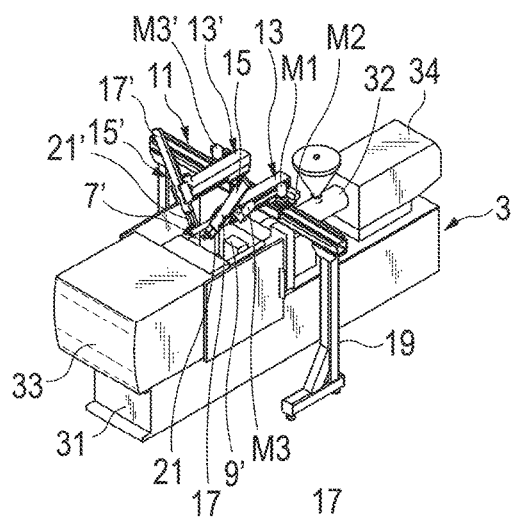
Figure 7C:
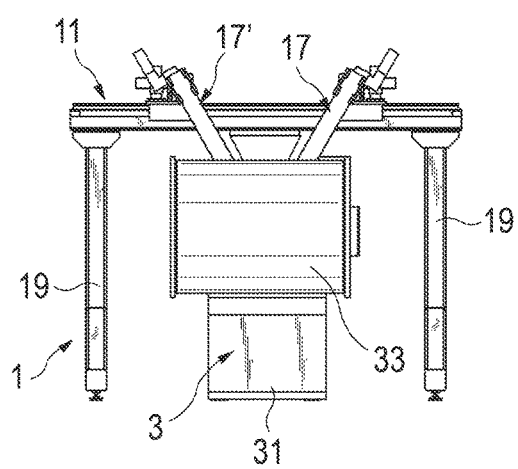
FIGS. 7C and 7D are a front view and a perspective view, respectively, of the equipment in which the apparatus is disposed with respect to the resin injection molding machine 3, illustrating that the two vertical arms are located at the lowermost position.
Figure 7D:
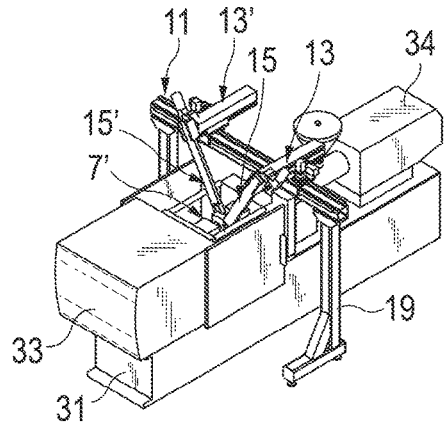
Figure 9A:
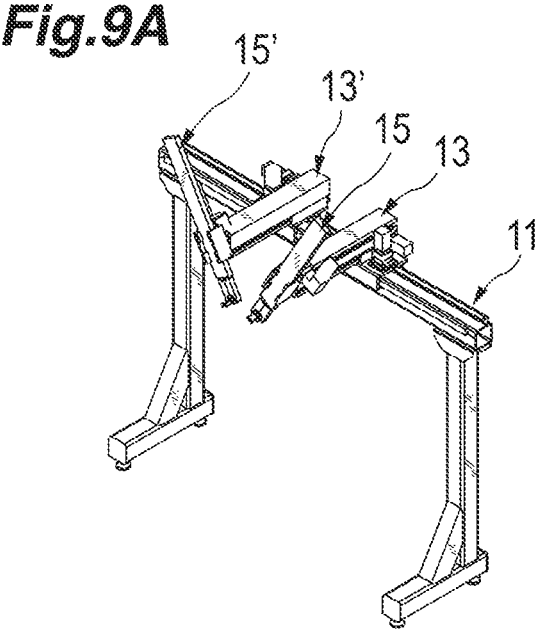
FIGS. 9A and 9B illustrate operation of two vertical arms.
Figure 9B:
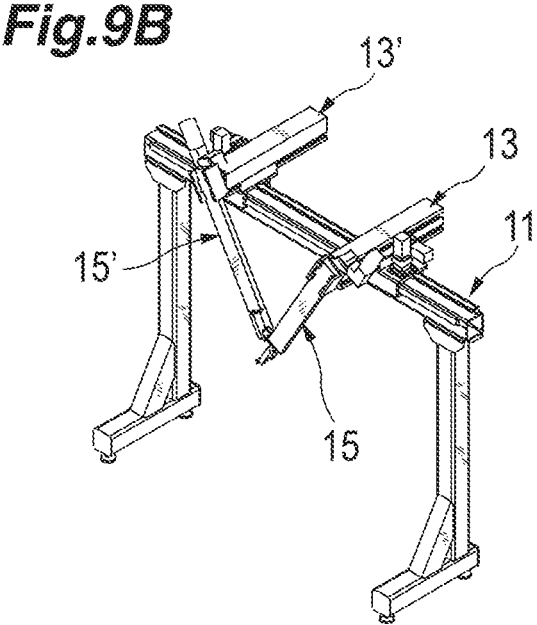

FIGS. 7A and 7B are a front view and a perspective view, respectively, of equipment for producing a molded product in which an apparatus 1 for taking out a molded product according to a second embodiment of the present invention is disposed with respect to a resin injection molding machine 3 which uses a three-plate molding die 7', illustrating that two vertical arms 15 and 15' are located at the uppermost position. FIGS. 7C and 7D are a front view and a perspective view, respectively, of the equipment in which the apparatus 1 is disposed with respect to the resin injection molding machine 3, illustrating that the two vertical arms 15 and 15' are located at the lowermost position. FIG. 8 is a front view of the equipment in which a fixed mold 9' of a three-plate molding die 7' of the resin injection molding machine 3 can be seen. FIGS. 9A and 9B illustrate operation of the two vertical arms 15 and 15'.

Figure 11A:
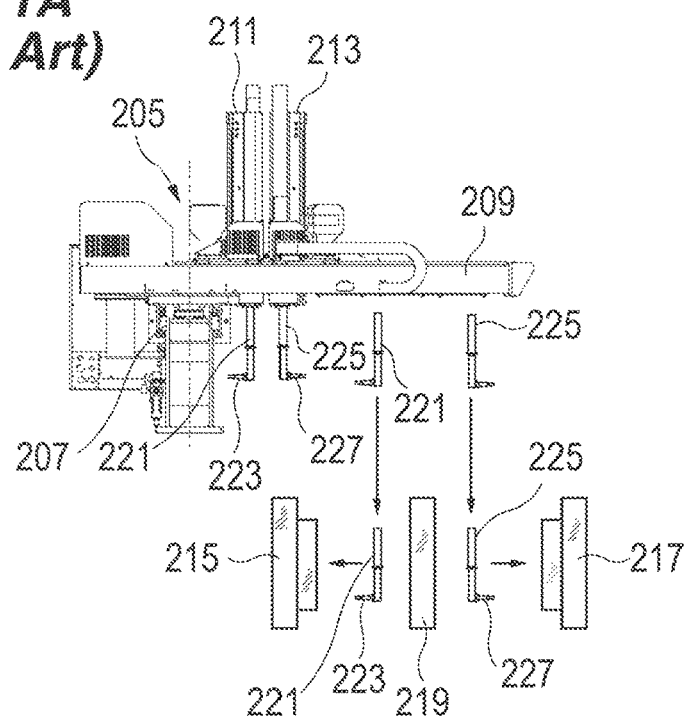
FIGS. 11A and 11B illustrate an example configuration of a conventional apparatus for taking out a molded product.
Figure 11B:
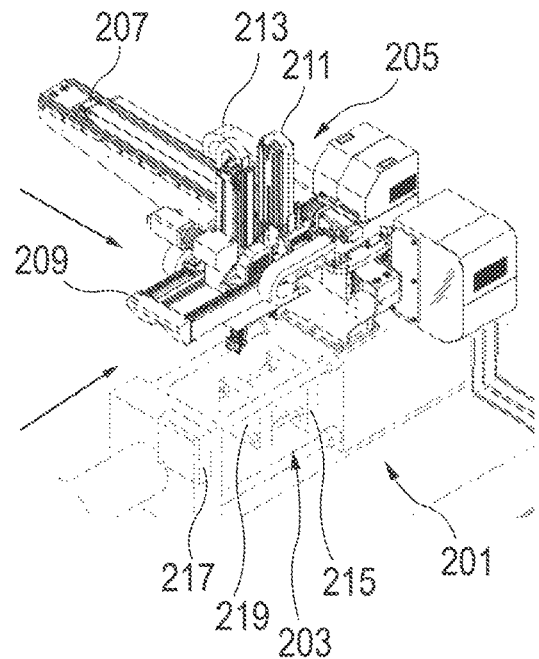

In FIGS. 7A-7D to 9, the same components as those according to the first embodiment illustrated in FIGS. 1A-1D to 6 are denoted by the same reference numerals as the reference numerals affixed to their counterparts in FIGS. 1A-1D to 6. In order for the resin injection molding machine 3 to use the three-plate molding die 7' as in the second embodiment, the transverse frame 11 is provided with two orthogonal frames 13 and 13' configured to be separately movable. As in the related art illustrated in FIGS. 11A and 11B, the resin injection molding machine 3 includes a fixed mold, a movable mold disposed so as to be movable with respect to the fixed mold, and an intermediate movable mold located between the fixed mold and the movable mold and disposed so as to be movable with respect to the fixed mold and the movable mold. The resin injection molding machine is configured to form a resin molded product between the fixed mold and the intermediate movable mold and to form another resin molded product between the intermediate movable mold and the movable mold.

The two vertical arms 15 and 15' are disposed respectively at the two orthogonal frames 13 and 13'. When the three-plate molding die is used, the number of steps in the take-out operation can be reduced by moving elevating shafts 17 and 17' of the vertical arms 15 and 15' from obliquely above to take out the resin molded products. The orthogonal frames 13 and 13' are movable in the longitudinal direction with respect to the transverse frame 11. The vertical arms 15 and 15' may be configured to be movable in the longitudinal direction with respect to the orthogonal frames 13 and 13'.

The two vertical arms 15 and 15' provided on the two orthogonal frames 13 and 13' are inclined such that respective axis lines AL and AL' of the elevating shafts 17 and 17' of the two vertical arms 15 and 15' cross each other on the side on which the resin injection molding machine 3 is located. With this configuration, the vertical arms 15 and 15' can be caused to approach resin molded products 10 and 10' (FIG. 10) from both sides of the molding die 7' in a smaller number of steps.

When the three-plate molding die 7' is used, the resin molded product 10 formed between the fixed mold and the intermediate movable mold is held and taken out by a holding member 21 provided at one of the two vertical arms 15 and 15', namely the vertical arm 15, and the resin molded product 10' formed between the intermediate movable mold and the movable mold is held and taken out by a holding member 21' provided at the other vertical arm 15'. Depending on the shapes of the resin molded products, take-out operation of the resin molded products can be completed simply by moving the vertical arms 15 and 15' up and down.

As a matter of course, the two vertical arms 15 and 15' may be provided on the orthogonal frames 13 and 13' such that the acute angle θ is adjustable also in the second embodiment as in the first embodiment. Also, as a matter of course, a longitudinal frame constituted of rails may be provided also in this embodiment as in the modification example illustrated in FIG. 6.

In the embodiment, further, the orthogonal frames 13 and 13' are movable in the longitudinal direction with respect to the transverse frame 11. As a matter of course, however, the vertical arms 15 and 15' may be movable in the longitudinal direction with respect to the orthogonal frames 13 and 13' with the orthogonal frames 13 and 13' being arranged not to be movable in the longitudinal direction with respect to the transverse frame 11.

INDUSTRIAL APPLICABILITY

According to the present invention, the number of steps of taking out a molded product can be reduced by one step, compared to the prior art. As a result, the take-out speed can be increased compared to the related art. In addition, depending on the shape of the resin molded product, the resin molded product can be taken out simply by moving the elevating shaft of the vertical arm up and down (the lowering step and the elevating step only). Further, if it is required that the resin molded product should be held only at its side regions, the apparatus of the present invention can cause the holding member provided at the distal end portion of the vertical arm to approach the resin molded product in the transverse direction (from the left and right sides) and hold the molded product at its side regions. Thus, the resin molded product can be taken out in a manner that cannot be achieved by the conventional apparatus for taking out a molded product.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

REFERENCE NUMERALS

1 Apparatus for taking out molded product
3 Resin injection molding machine
11 Transverse frame
15 Vertical arm
17 Elevating shaft
19 Leg portion
21 Holding member

What is claimed is:
1. An apparatus for taking out a molded product, comprising:
 a transverse frame disposed above a resin injection molding machine to extend in a transverse direction that is orthogonal to a longitudinal direction defined as a direction in which a molding die of the resin injection molding machine is opened and closed;

at least one orthogonal frame supported by the transverse frame so as to be movable at least in the transverse direction;

at least one guide member mounted to the at least one orthogonal frame and at least one vertical arm guided by the at least one guide member so as to be movable up and down at least in a vertical direction; and at least one holding member provided at a distal end portion of the at least one vertical arm to hold a resin molded product formed by the resin injection molding machine, wherein the at least one vertical arm is disposed on the at least one guide member so as to be inclined at all times when the at least one vertical arm is in motion such that an axis line of an elevating shaft of the at least one vertical arm forms an acute angle with respect to a perpendicular extending in the vertical direction.

2. The apparatus for taking out a molded product according to claim 1, wherein:

the at least one orthogonal frame includes two orthogonal frames;

the at least one vertical arm includes two vertical arms;

the transverse frame is provided with the two orthogonal frames configured to be separately movable; and the two vertical arms are disposed respectively at the two orthogonal frames.

3. The apparatus for taking out a molded product according to claim 1, wherein the at least one orthogonal frame is movable in the longitudinal direction with respect to the transverse frame.

4. The apparatus for taking out a molded product according to claim 1, wherein the at least one vertical arm is provided at the at least one orthogonal frame so as further to be movable in the longitudinal direction.

5. The apparatus for taking out a molded product according to claim 1, further comprising:

a longitudinal frame extending in the longitudinal direction, wherein the transverse frame is supported by the longitudinal frame so as to be movable in the longitudinal direction.

6. The apparatus for taking out a molded product according to claim 1, wherein the at least one vertical arm is provided at the at least one orthogonal frame such that the acute angle is changeable when the at least one vertical arm is not in motion.

7. The apparatus for taking out a molded product according to claim 2, wherein the two vertical arms respectively provided on the two orthogonal frames are inclined such that the axis lines of the respective elevating shafts of the two vertical arms may cross each other on a side on which the resin injection molding machine is located.

8. The apparatus for taking out a molded product according to claim 7, wherein:

the resin injection molding machine comprises a fixed mold, a movable mold disposed so as to be movable with respect to the fixed mold, and an intermediate movable mold located between the fixed mold and the movable mold and disposed so as to be movable with respect to the fixed mold and the movable mold;

the resin injection molding machine is configured to form a resin molded product between the fixed mold and the intermediate movable mold and to form another resin molded product between the intermediate movable mold and the movable mold; and the resin molded product formed between the fixed mold and the intermediate movable mold is held and taken out by one of the two holding members provided on one of the two vertical arms, and the resin molded product formed between the intermediate movable mold and the movable mold is held and taken out by the other of the two holding members provided on the other of the two vertical arms.

9. The apparatus for taking out a molded product according to claim 2, wherein the at least one orthogonal frame is movable in the longitudinal direction with respect to the transverse frame.

10. The apparatus for taking out a molded product according to claim 2, wherein the at least one vertical arm is provided at the at least one orthogonal frame so as further to be movable in the longitudinal direction.

11. The apparatus for taking out a molded product according to claim 2, further comprising:

a longitudinal frame extending in the longitudinal direction, wherein the transverse frame is supported by the longitudinal frame so as to be movable in the longitudinal direction.

12. The apparatus for taking out a molded product according to claim 2, wherein the at least one vertical arm is provided at the at least one orthogonal frame such that the acute angle is changeable when the at least one vertical arm is not in motion.

13. The apparatus for taking out a molded product according to claim 3, wherein the at least one vertical arm is provided at the at least one orthogonal frame such that the acute angle is changeable when the at least one vertical arm is not in motion.

14. The apparatus for taking out a molded product according to claim 4, wherein the at least one vertical arm is provided at the at least one orthogonal frame such that the acute angle is changeable when the at least one vertical arm is not in motion.

15. The apparatus for taking out a molded product according to claim 5, wherein the at least one vertical arm is provided at the at least one orthogonal frame such that the acute angle is changeable when the at least one vertical arm is not in motion.

16. The apparatus for taking out a molded product according to claim 9, wherein the at least one vertical arm is provided at the at least one orthogonal frame such that the acute angle is changeable when the at least one vertical arm is not in motion.

17. The apparatus for taking out a molded product according to claim 10, wherein the at least one vertical arm is provided at the at least one orthogonal frame such that the acute angle is changeable when the at least one vertical arm is not in motion.

18. The apparatus for taking out a molded product according to claim 11, wherein the at least one vertical arm is provided at the at least one orthogonal frame such that the acute angle is changeable when the at least one vertical arm is not in motion.

* * * * *